United States Patent
Ozaki et al.

(10) Patent No.: US 9,087,057 B2
(45) Date of Patent: Jul. 21, 2015

(54) CONTENT PROCESSING APPARATUS, METHOD, AND SYSTEM

(75) Inventors: Hiroki Ozaki, Kanagawa (JP); Hiroshi Baba, Kanagawa (JP); Shinsuke Yanazume, Kanagawa (JP); Shoh Nagamine, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 148 days.

(21) Appl. No.: 13/431,227

(22) Filed: Mar. 27, 2012

(65) Prior Publication Data

US 2012/0259879 A1 Oct. 11, 2012

(30) Foreign Application Priority Data

Apr. 7, 2011 (JP) ................. 2011-085460

(51) Int. Cl.
*G06F 17/30* (2006.01)
(52) U.S. Cl.
CPC ................. *G06F 17/3002* (2013.01)
(58) Field of Classification Search
CPC .................................. G06F 17/3002
USPC ........................ 707/758, E17.005
See application file for complete search history.

(56) References Cited

U.S. PATENT DOCUMENTS

| | | | | |
|---|---|---|---|---|
| 5,552,806 A * | 9/1996 | Lenchik | ......... | 345/156 |
| 7,848,780 B2 * | 12/2010 | Washio et al. | ......... | 455/558 |
| 2004/0098486 A1 * | 5/2004 | Gu et al. | ......... | 709/228 |
| 2005/0144189 A1 * | 6/2005 | Edwards et al. | ......... | 707/102 |
| 2006/0215585 A1 * | 9/2006 | Taniwaki | ......... | 370/260 |
| 2007/0061243 A1 * | 3/2007 | Ramer et al. | ......... | 705/37 |
| 2007/0168453 A1 * | 7/2007 | Ito et al. | ......... | 709/213 |
| 2009/0034723 A1 | 2/2009 | Yanazume | | |
| 2009/0150491 A1 * | 6/2009 | Yamamoto | ......... | 709/204 |
| 2009/0257079 A1 * | 10/2009 | Amano | ......... | 358/1.14 |

FOREIGN PATENT DOCUMENTS

| | | |
|---|---|---|
| JP | 2001-053916 A | 2/2001 |
| JP | 2002-358325 A | 12/2002 |
| JP | 2007-011760 A | 1/2007 |
| JP | 2010-244578 A | 10/2010 |

* cited by examiner

*Primary Examiner* — Wei Zhen
*Assistant Examiner* — Mohammed Huda
(74) *Attorney, Agent, or Firm* — Harness, Dickey & Pierce, P.L.C.

(57) ABSTRACT

A content processing apparatus managed as a content-using apparatus in apparatus information associating a content-using apparatus that supports content data with functions available in using the content data, and having a content processing unit that processes content data in response to a user's operation so that the user can utilize the content data, a used function identification unit that identifies a function used to process the content data and generates used function information indicating the identified function, and an apparatus search result display unit to display information of a content-using apparatus extracted by searching through apparatus information based on the used function information.

10 Claims, 8 Drawing Sheets

FIG. 3
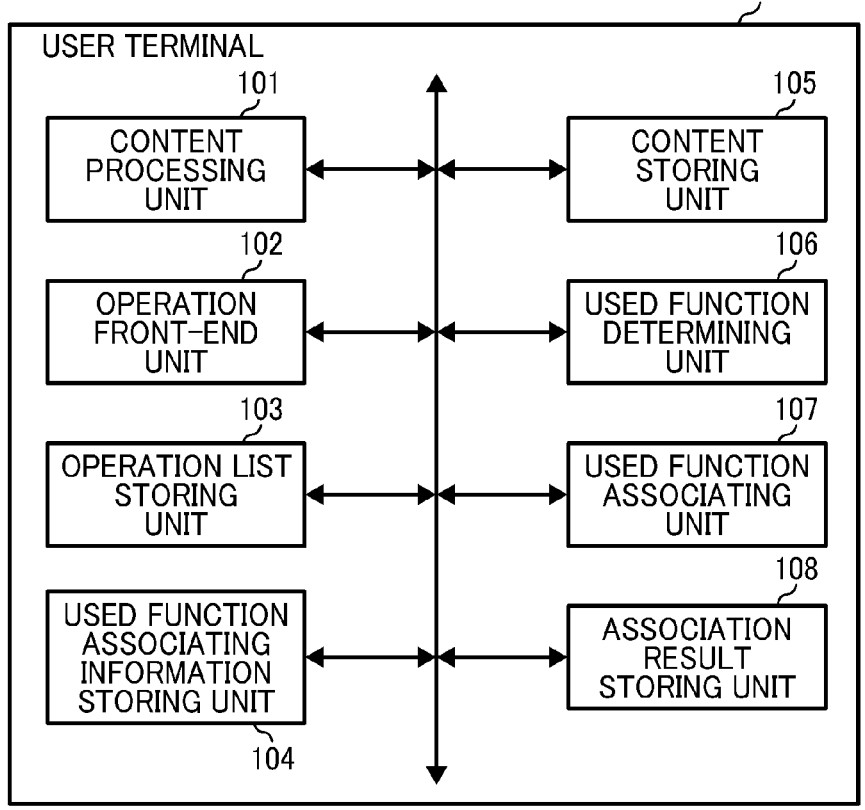
FIG. 4
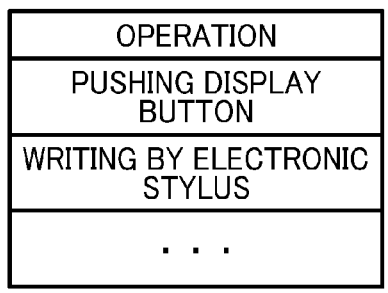
FIG. 5
| OPERATION | AVAILABLE FUNCTION |
|---|---|
| PUSHING DISPLAY BUTTON | DISPLAYING PPT, DISPLAYING PDF, DISPLAYING JPG, DISPLAYING BMP · · · |
| WRITING BY ELECTRONIC STYLUS | EDITING PPT, EDITING PDF, EDITING JPG, EDITING BMP · · · |
| · · · | |

FIG. 6

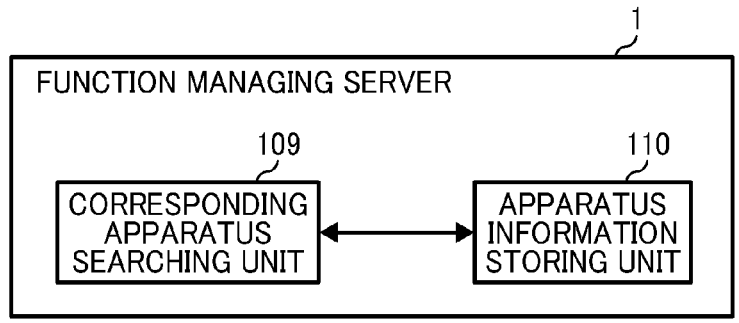

FIG. 7

| APPARATUS NAME | SUPPORTING FUNCTION | INSTALLATION LOCATION | |
|---|---|---|---|
| PROJECTOR | DISPLAYING PDF, DISPLAYING JPG, DISPLAYING BMP · · · | CONFERENCE ROOM A | · · · |
| LAPTOP PC | DISPLAYING/EDITING PPT, DISPLAYING/ EDITING PDF, DISPLAYING/EDITING JPG, · · · | CONFERENCE ROOM B | |
| ELECTRONIC WHITEBOARD | DISPLAYING/EDITING PDF, DISPLAYING/ EDITING JPG, DISPLAYING/EDITING BMP, · · · | RECEPTION ROOM A | |
| | · · · | | |

FIG. 8

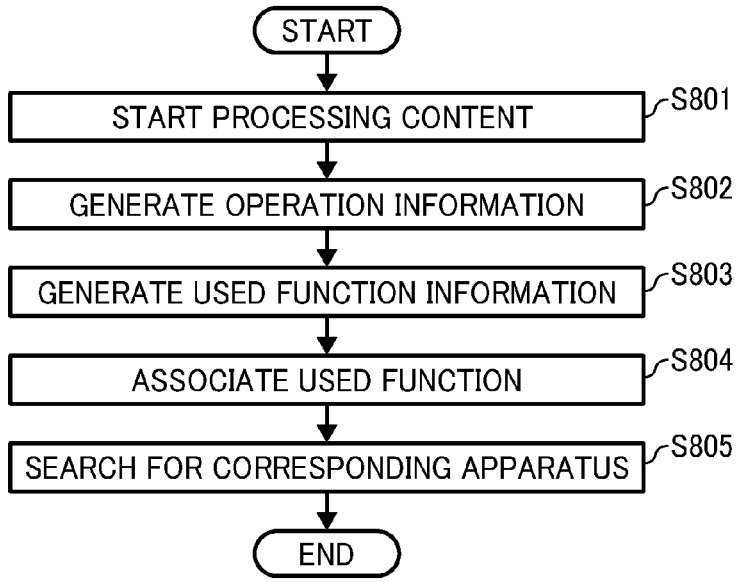

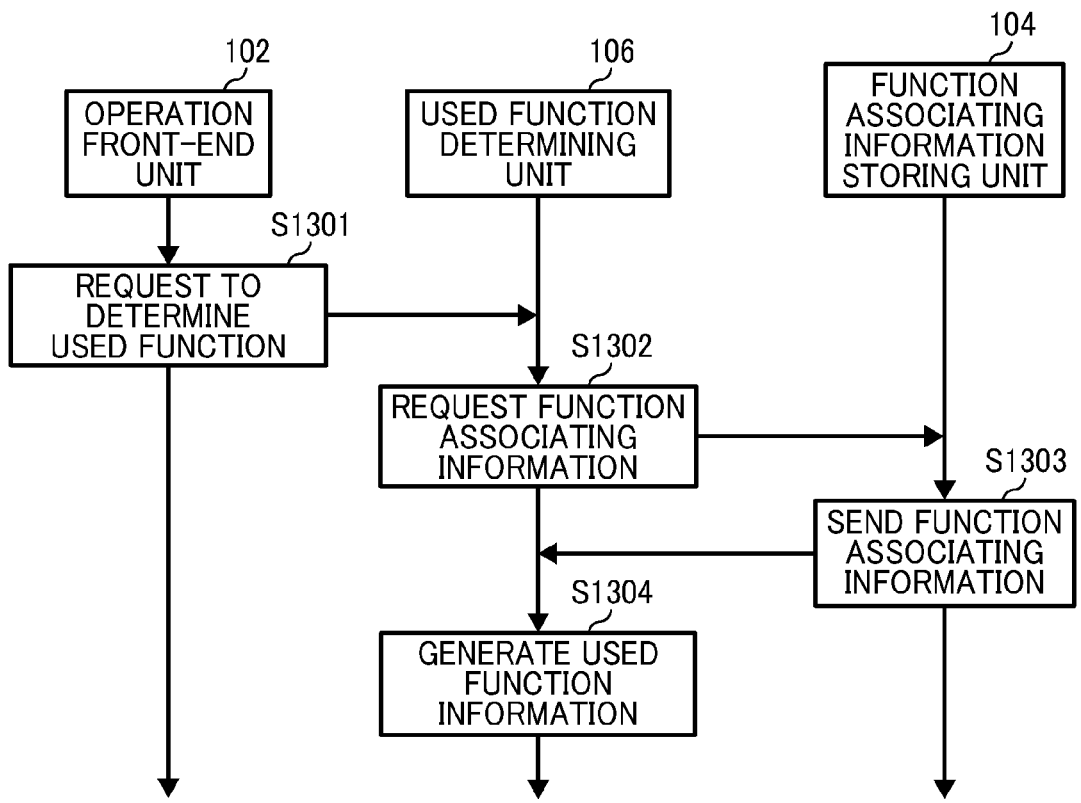

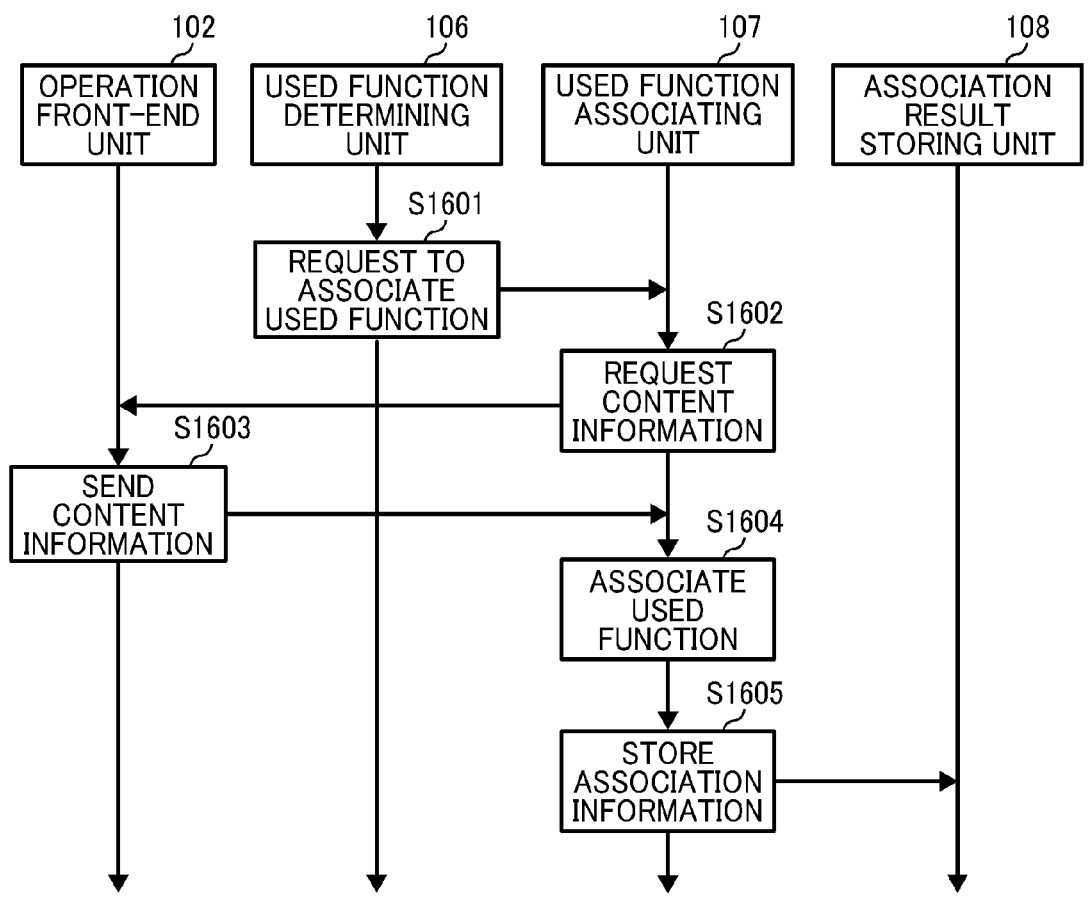

FIG. 17

| APPARATUS NAME | INSTALLATION LOCATION | |
|---|---|---|
| LAPTOP PC | CONFERENCE ROOM B | ... |
| ELECTRONIC WHITEBOARD | RECEPTION ROOM A | |
| ... | | |

FIG. 18

| OPERATION | RUNNING MODULE | USED FUNCTION |
|---|---|---|
| PUSHING DISPLAY BUTTON | APPLICATION A | DISPLAYING PPT |
| WRITING BY ELECTRONIC STYLUS | APPLICATION A | EDITING PPT |
| PUSHING DISPLAY BUTTON | APPLICATION B | DISPLAYING PDF |
| WRITING BY ELECTRONIC STYLUS | APPLICATION B | EDITING PDF |
| ... | | |

FIG. 19

| CONTENT DATA | OPERATION | OPERATION RECORD |
|---|---|---|
| CONTENT A | PUSHING DISPLAY BUTTON | OPERATED |
| | WRITING BY ELECTRONIC STYLUS | NOT OPERATED |
| | ... | |
| CONTENT B | PUSHING DISPLAY BUTTON | OPERATED |
| | WRITING BY ELECTRONIC STYLUS | OPERATED |
| | ... | |

FIG. 20

CONTENT NAME
 CONTENT_A.PPT

USED FUNCTION
 DISPLAYING PPT

CONTENT NAME
 CONTENT_B.PDF

USED FUNCTION
 DISPLAYING PDF, EDITING PDF

FIG. 21

| CONTENT DATA | AVAILABLE FUNCTION | ON/OFF |
|---|---|---|
| CONTENT A | OUTPUTTING SOUND | ON |
| | INPUTTING BY ELECTRONIC STYLUS | OFF |
| | DISPLAYING CONTENT | ON |
| | EDITING CONTENT | OFF |
| | . . . | |
| CONTENT B | OUTPUTTING SOUND | OFF |
| | INPUTTING BY ELECTRONIC STYLUS | ON |
| | DISPLAYING CONTENT | ON |
| | EDITING CONTENT | OFF |
| | . . . | |

FIG. 22

| CONTENT DATA | CONNECTED DEVICE |
|---|---|
| CONTENT A | NONE |
| CONTENT B | ELECTRONIC STYLUS |
| . . . | |

CONTENT PROCESSING APPARATUS, METHOD, AND SYSTEM

CROSS-REFERENCE TO RELATED APPLICATION

This patent application is based on and claims priority pursuant to 35 U.S.C. §119 to Japanese Patent Application No. 2011-085460, filed on Apr. 7, 2011, the entire disclosure of which is hereby incorporated by reference herein.

BACKGROUND OF THE INVENTION

1. Field of the Invention

The present invention relates to a content processing apparatus, a content processing method, and a content processing system, and more particularly to facilitating use of identical content on different information processing apparatuses.

2. Description of the Related Art

Along with the popularization of the internet and advances in multimedia technology, information exchange over networks is developing to incorporate not only exchange of simple text data such as e-mail but also exchange of various content data such as sound data, image data, and movie data that includes both sound and video. These content data are exchanged among various types of terminals such as cell phones and laptop personal computers (PCs). To display content properly on various different terminals, a method to distribute content data converted to format corresponding to display capability of terminal that requested the content data has been proposed (e.g., JP-2007-11760-A.)

Meanwhile, apparatuses such as projectors and electronic whiteboards also use content data in addition to cell phones and laptop PCs. Also, the way the content is used is changing, from not simply passively viewing movies, listening to audio, and browsing images to being able to edit documents and images. Yet the technology described in JP-2007-11760-A is limited to passively displaying content, and moreover such technology cannot apply to apparatuses that do not have editing functions in the first place.

For example, in displaying and editing content in a format by using an electronic whiteboard in a conference room, to move to another conference room and continue the meeting, an apparatus that supports displaying and editing content in that format is necessary in the destination conference room. That means users cannot continue the meeting under the same conditions as in the original conference room in case the apparatus in the destination conference room lacks the capability to edit information even if content is distributed in a format adapted to the apparatus at the destination conference room.

It should be noted that this kind of issue can be a problem not only distributing information but also using content in a format on a different information processing apparatus.

BRIEF SUMMARY OF THE INVENTION

The present invention provides a novel information processing apparatus, method, and system that facilitates use of content in one format on an information processing apparatus that uses a different format.

More specifically, the present invention provides a content processing apparatus managed as a content-using apparatus in apparatus information associating a content-using apparatus that supports a content data with available functions in using the content data, and the content processing apparatus includes a content processing unit that processes content data in compliance with a user's operation so that the user can utilize the content data, a used function identification unit which determines used function required to process the content data that the user utilizes and generates used function information including the determined function, and an apparatus search result display unit that displays information of content-using apparatus extracted by searching through apparatus information based on the used function information.

The present invention also provides a method to process content that includes a content data processing step in compliance with a user's operation on a content-using apparatus so that the user can utilize the content data, a used function determining step which determines a used function required to process the content data that the user utilizes, a used function information generating step that generates used function information that includes description of the determined used function, a content-using apparatus extracting step which extracts content-using apparatus utilizable the content data by searching through apparatus information associating content-using apparatus utilizable the content data with utilizable function in using the content data with reference to the used function information, and a displaying step to display information on extracted content-using apparatus.

The present invention also provides a content processing system that includes the content processing apparatus described above.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3 is a diagram illustrating functions of a content-using apparatus as an embodiment of the present invention.

FIG. 4 is a diagram illustrating an operation list as an embodiment of the present invention.

FIG. 5 is a diagram illustrating an example of available function associating information as an embodiment of the present invention.

FIG. 6 is a diagram illustrating an example of a function managing server as an embodiment of the present invention.

FIG. 7 is a diagram illustrating an example of apparatus information as an embodiment of the present invention.

FIG. 8 is a flowchart illustrating operation of a whole content processing system as an embodiment of the present invention.

FIG. 11 is a diagram illustrating an example of content information as an embodiment of the present invention.

FIG. 12 is a diagram illustrating an example of operation information as an embodiment of the present invention.

FIG. 13 is a sequence diagram illustrating a generating operation of used function information as an embodiment of the present invention.

FIG. 14 is a diagram illustrating a example of used function information as an embodiment of the present invention.

FIG. 15 is a sequence diagram illustrating used function associating operation as an embodiment of the present invention.

FIG. 16 is a diagram illustrating a result of used function association as an embodiment of the present invention.

FIG. 17 is a diagram illustrating a result of searching for apparatus as an embodiment of the present invention.

FIG. 18 is a diagram illustrating an example of used function associating information as another embodiment of the present invention.

FIG. 19 is a diagram illustrating an example of operation information as another embodiment of the present invention.

FIG. 20 is a diagram illustrating a result of used function association as another embodiment of the present invention.

FIG. 21 is a diagram illustrating an example of information on on/off of functions as another embodiment of the present invention.

FIG. 22 is a diagram illustrating information on connected devices as another embodiment of the present invention.

DETAILED DESCRIPTION OF THE PREFERRED EMBODIMENTS

Figure 1:
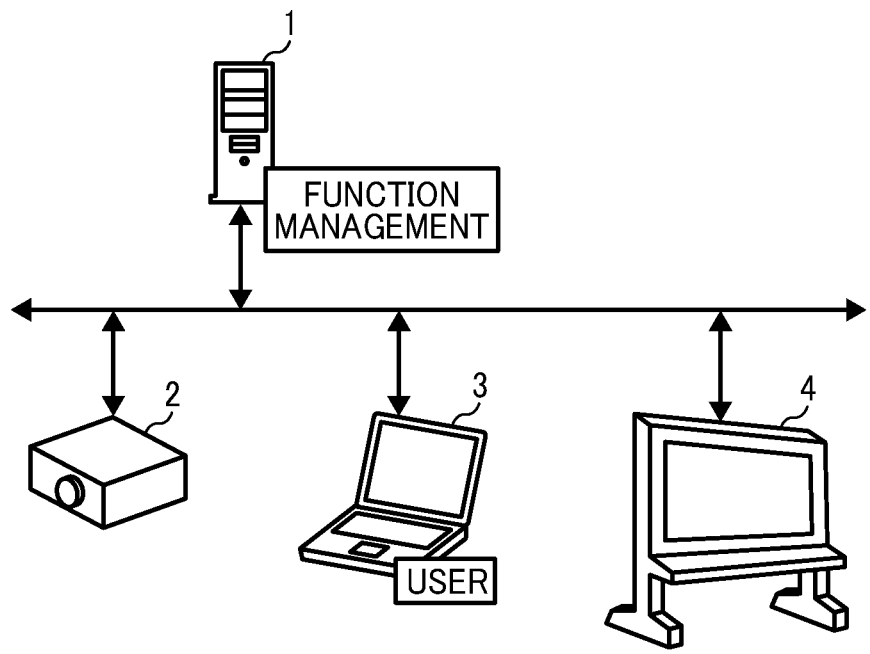
FIG. 1 is a diagram illustrating a content processing system as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

An embodiment of the present invention will be described in detail below with reference to the drawings. In this embodiment, a description is given of an example of a content processing system in which content-using apparatuses and a function managing server are connected with each other via a network, and which, based on information generated in association with use content on an original content-using apparatus, can search for other apparatuses capable of utilizing such content in the same way as the original apparatus.

FIG. 1 is a diagram showing an example of operation of a content processing system of the present embodiment. As shown in FIG. 1, content-using apparatuses such as a projector 2, a user terminal 3 e.g. laptop PCs and an electronic whiteboard 4, and a function managing server 1 that manages functions of those apparatuses are connected with each other via a network.

Figure 2:
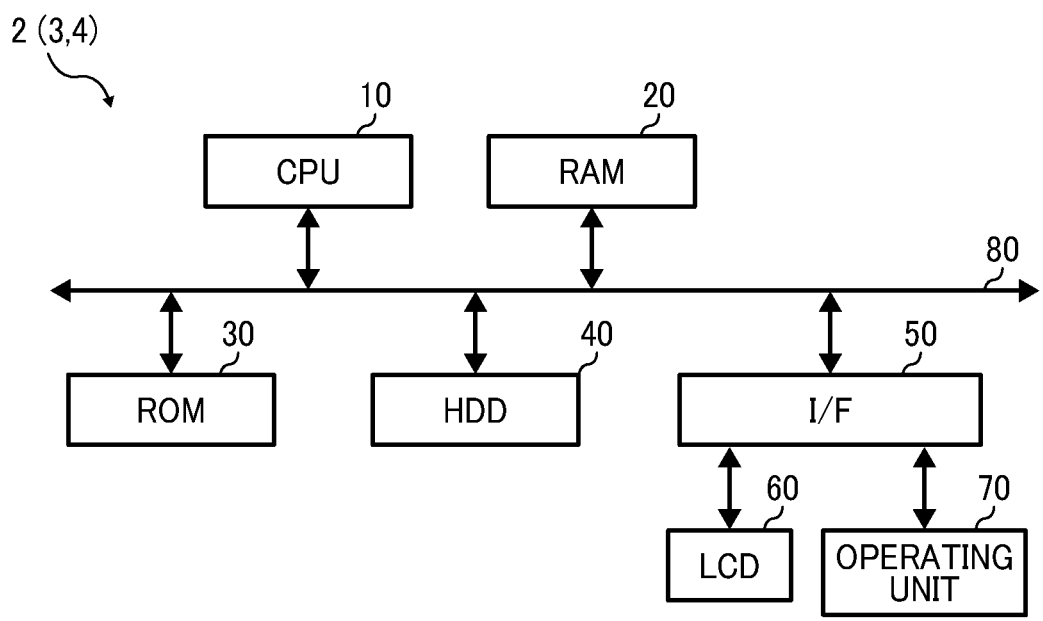
FIG. 2 is a diagram illustrating a hardware architecture of an information processing apparatus as an embodiment of the present invention

Each of the function managing server 1, the projector 2, the user terminal 3 and the electronic whiteboard 4 in FIG. 1 is configured as an information processing apparatus. Hardware architecture of the information processing apparatuses of this embodiment is shown in FIG. 2. In the following description, the hardware architecture of the user terminal 3 is described as an example, but the architecture is the same for the function managing server 1, the projector 2, and the electronic whiteboard 4.

As shown in FIG. 2, the user terminal 3 of this embodiment includes the same units as general-purpose servers and PCs. That is, in the user terminal 3 of this embodiment, a CPU 10, a RAM 20, a ROM 30, a hard disk drive (HDD) 40 and an interface (I/F) 50 are connected with each other via a bus 80. A liquid crystal display (LCD) 60 and an operating unit 70 are connected to the I/F 50.

The CPU 10 is a processor and controls the whole operation of the user terminal 3. The RAM 20 is a volatile storage medium that can read/write information with high speed and is used as a working area when the CPU 10 processes information. The ROM 30 is a nonvolatile storage medium that can only be read. Programs such as firmware are stored in the ROM 30. The HDD 40 is a nonvolatile storage medium that can read/write information. Programs such as the operating system (OS), various control programs, and application programs are stored in the HDD 40.

The I/F 50 connects the bus 80 with various pieces of hardware and the network, and controls them. The LCD 60 is a visual user interface for a user to check the status of the user terminal 3. The operating unit 70 is a user interface for a user to input information to the user terminal 3, such as keyboard, mouse, touch panel, and various buttons. It should be noted that the function managing server 1 of this embodiment is operated as a server, so it can operate without user interfaces such as the LCD 60 and the operating unit 70. Also, the projector 2 includes a projecting unit as a display unit instead of the LCD 60.

In the hardware architecture described above, a software control unit is constructed as the programs stored on storage media such as the ROM 30, the HDD 40, and optical disks (not shown in figures) are read out to the RAM 20 and run under the control of the CPU 10. With the combination of the software control unit described above and the hardware, functional blocks that implement the features of the function managing server 1, the projector 2, the user terminal 3, and the electronic whiteboard 4 of this embodiment are composed.

Next, functional components of content-using apparatus of this embodiment will be described referring to FIG. 3. FIG. 3 is a block diagram illustrating functional components of content-using apparatuses of this embodiment such as the projector 2, the user terminal 3, and the electronic whiteboard 4. As shown in FIG. 3, content-using apparatuses of this embodiment include a content processing unit 101, an operation front-end unit 102, an operation list storing unit 103, a function associating information storing unit 104, a content storing unit 105, a used function identification unit 106, a used function associating unit 107, and an association result storing unit 108.

The content processing unit 101 executes processes such as displaying and editing content on each content-using apparatus. Therefore, the content processing unit 101 is implemented by units such as the CPU 10 that operates in conjunction with application programs adapted to the particular format of the content data, application-specific integrated circuits, and the LCD 60 that displays content data.

Functions that the content processing unit 101 in the projector 2 has are different from functions that the content processing unit 101 in the user terminal 3 has and functions that the content processing unit 101 in the electronic whiteboard 4 has. For example, the content processing unit 101 in the projector 2 reads content data and processes images to be displayed, and displays content data by projecting its image. By contrast, the content processing unit 101 in the user terminal 3 and the electronic whiteboard 4 read content data and process images to be displayed, display images of content data, and edit content data in response to a user operation.

The operation front-end unit 102 accepts operational input from the user and executes processes in response to such operations in each content-using apparatus. Therefore, the operation front-end unit 102 is implemented by units such as the operating unit 70 and the CPU 10 or chips that operate in accordance with programs adapted to processing in response to user operational input.

The operation list storing unit 103 stores a list of operations that can be done by users in each content-using apparatus and is implemented by a storage apparatus such as the HDD 40.

An operation list that the operation list storing unit 103 stores includes information on kinds of operations, such as "pushing display button" or "writing by electronic stylus" as shown in FIG. 4.

The function associating information storing unit 104 stores function associating information that associates a particular operation done by a user with a particular function in response to the operation in each content-using apparatus, and is implemented by a storage apparatus such as the HDD 40. Function associating information that the function associating information storing unit stores includes information associating "operation" at each content-using apparatus with "function" used in response to the operation as shown in FIG. 5.

The content storing unit 105 stores content data used in each content-using apparatus and is implemented by a storage apparatus such as the HDD 40. The used function identification unit 106 identifies the function used at a content-using apparatus based on the function associating information shown in FIG. 5 and the format of processed content data. The used function associating unit 107 generates information associating the function identified by the used function identification unit 106 with information indicating content data processed by the content processing unit 101.

Information generated by the used function associating unit 107 describes how content data was used on a particular content-using apparatus. This information is used to determine whether or not the content data can be used in the same way on a different content-using apparatus.

That is, determining used function with the used function identification unit 106 and generating associated information with the used function associating unit 107 is a key feature of this embodiment. The used function identification unit 106 and the used function associating unit 107 are implemented by units such as the CPU 10 that operates in conjunction with programs and application-specific integrated circuits implementing each function. The association result storing unit 108 stores information generated by the used function associating unit 107 and is implemented by a storage apparatus such as the HDD 40.

Next, functional components of the function managing server 1 of this embodiment will be described. FIG. 6 is a functional block diagram illustrating functional components of the function managing server 1 of this embodiment. As shown in FIG. 6, the function managing server 1 of this embodiment includes a corresponding apparatus searching unit 109 and an apparatus information storing unit 110. The corresponding apparatus searching unit 109 searches for an apparatus that can use content data in the same way as the original apparatus based on information generated by the used function associating unit 107 from apparatus information that the apparatus information storing unit 110 stores. The corresponding apparatus searching unit 109 is implemented by the CPU 10 that operates in conjunction with a program implementing its function.

The apparatus information storing unit 110 stores apparatus information that the corresponding apparatus searching unit 109 uses to execute the searching described above and is implemented by a storage apparatus such as the HDD 40. FIG. 7 illustrates an example of apparatus information in this embodiment. As shown in FIG. 7, an "apparatus name" that indicates name of each content-using apparatus, a "supporting function" indicating the features included in each of the apparatuses, and an "installation location" that indicates location where each content-using apparatus is located are associated in apparatus information.

"Apparatus name" in FIG. 7 indicates content-using apparatuses such as the projector 2, the user terminal 3, and the electronic whiteboard 4 in FIG. 1. That is, in the content processing system of this embodiment, each content-using apparatus is managed with apparatus information as shown in FIG. 7.

Next, operation of the content processing system of this embodiment will be described. FIG. 8 is a flowchart that illustrates operation of the content processing system of this embodiment. As shown in FIG. 8, in the content processing system of this embodiment, a content-using apparatus starts processes regarding using content in response to operational input from a user (S801).

After starting processing content, the content-using apparatus generates operation information in response to the user's operation (S802). Then the content-using apparatus identifies the used function based on the generated operation information and generates available function information (S803). Subsequently, the content-using apparatus associates generated available function information with information of content being processed and generates association information (S804). Lastly, the function managing server 1 searches for corresponding apparatus based on the association information, after which the content processing system finishes processing. Each process block will be described in detail below.

Figure 9:
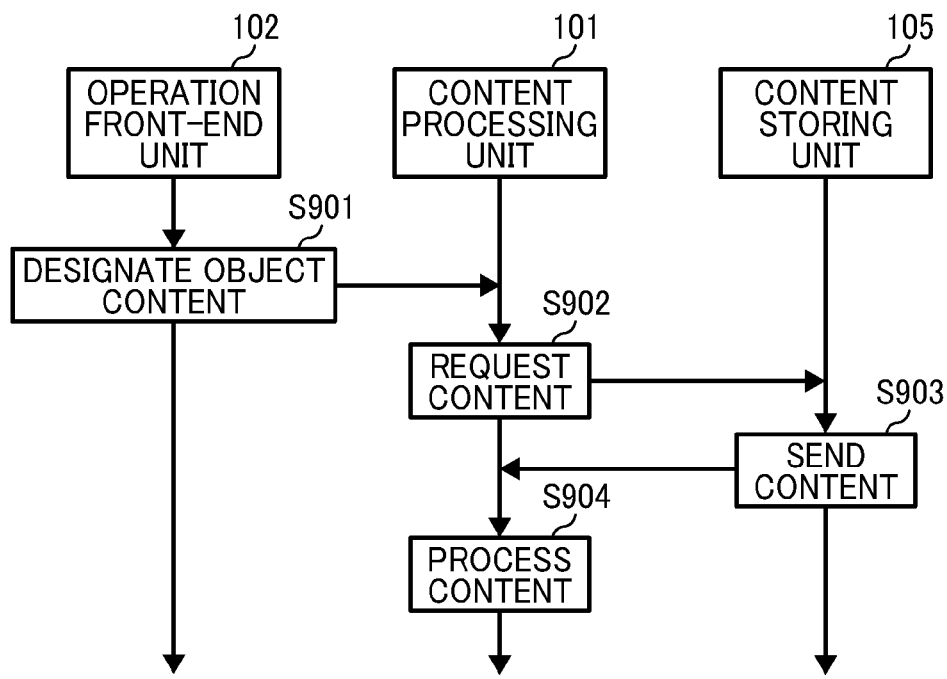
FIG. 9 is a sequence diagram illustrating a starting operation of content processing as an embodiment of the present invention.

FIG. 9 is a sequence diagram that illustrates the processes of starting using content in S801 in detail. As shown in FIG. 9, the operation front-end unit 102 in a content-using apparatus designates object content to the content processing unit 101 in response to user's operation to request to start using content. Then the content processing unit 101 issues a request for designated content to the content storing unit 105 (S902).

The content storing unit 105 reads content data that the content processing unit 101 requests and sends the content data to the content processing unit 101 (S903). After receiving the content data, the content processing unit 101 processes the content with a function adapted to the format of the received content data in accordance with the user's operation (S904).

Figure 10:
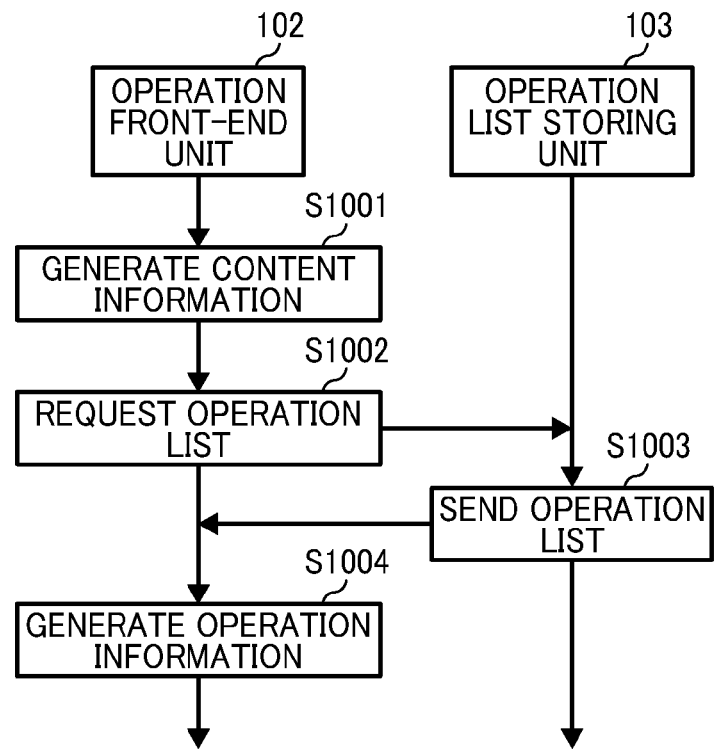
FIG. 10 is a sequence diagram illustrating operation information generating process as an embodiment of the present invention.

FIG. 10 is a sequence diagram that illustrates processes of generating operation information in S802 in detail. As shown in FIG. 10, after finishing the processes shown in FIG. 9, the operation front-end unit 102 generates content information that indicates content designated by the user (S1001). FIG. 11 illustrates an example of content information generated in S1001. The content information includes the file name of the content data, such as "xxxx_meeting_material.ppt" as content name. Generated content information is stored in storage medium such as the RAM 20 and the HDD 40 temporarily.

Next, the operation front-end unit 102 issues a request for the operation list shown in FIG. 4 to the operation list storing unit 103 (S1002). The operation list storing unit 103 sends the operation list in response to the request from the operation front-end unit 102 (S1003). After receiving the operation list, the operation front-end unit 102 generates operation information by writing "operated" to "operation record" in accordance with user's operation whenever the operation front-end unit 102 accepts operation from a user as shown in FIG. 12 (S1004).

FIG. 13 is a sequence diagram that illustrates processes of generating used function information in S803 in detail. As shown in FIG. 13, after finishing the processes shown in FIG. 10, the operation front-end unit 102 sends the generated operation information to the used function identification unit 106 and requests identification of which function was used (S1301). Then the used function identification unit 106 issues a request for function association information in FIG. 5 to the function associating information storing unit 104 (S1302).

The function associating information storing unit 104 sends function associating information to the used function identification unit 106 in response to the request from the used function identification unit 106 (S1303). The used function identification unit 106 refers to function associating information received from the function associating information storing unit 104 and identifies used function corresponding to "operation" turned to "operated" in the operation information received from the operation front-end unit 102. Then the used function identification unit 106 identifies the actual used function from "displaying ppt", "displaying pdf" and so on based on the content data that the content processing unit 101 is processing and generates used function information as shown in FIG. 14 (S1304).

It should be noted that the used function identification unit 106 determines which function was actually used, "displaying ppt", "displaying pdf", or "displaying jpg" depending on information such as an extension of the content data (content data extension) that the content processing unit is processing or an identifier included in the content data, and identifies the function actually used.

FIG. 15 is a sequence diagram that illustrates processes of associating used function in S804 in detail. As shown in FIG. 15, after finishing the processes shown in FIG. 13, the used function identification unit 106 sends generated used function information to the used function associating unit 107 and requests association of the used function (S1601). Then the used function associating unit 107 issues a request for content information to associate with used function to the operation front-end unit 102 (S1602).

The operation front-end unit 102 sends content information generated in S1001 in FIG. 10 to the used function associating unit 107 (S1603). After receiving content information from the operation front-end unit 102, the used function associating unit 107 associates the content information with the used function information received from the used function identification unit 106 in S1601 and generates association result information as shown in FIG. 16 (S1604). Lastly, the used function associating unit 107 stores the association result information to the association result storing unit 108 and finishes processing.

By going through these processes, association result information that associates content name with used function as shown in FIG. 16 is generated when content is used on each content-using apparatus in FIG. 1. In continuing to use the same content data on a different content-using apparatus, a user can keep utilizing the same kind of function on another content-using apparatus found by the corresponding apparatus searching unit 109 in the function managing server 1 searching the apparatus information stored in the apparatus information storing unit 110 while referencing the association result information.

In searching for a corresponding apparatus, a content-using apparatus which a user has utilized to process content data sends generated association result information as shown in FIG. 16 to the apparatus managing server 1 and requests to search for corresponding apparatus. In the apparatus managing server 1, the corresponding apparatus searching unit 109 searches used function information included in association result information received from the content-using apparatus and extracts the corresponding apparatus in accordance with the function as shown in FIG. 17. At the same time, the corresponding apparatus searching unit 109 also extracts "installation location" in association with each "apparatus name" and sends it to the content-using apparatus that is the source of request to search for apparatus.

By going through these processes, the content-using apparatus acquires apparatus search results generated by the apparatus managing server 1. By displaying information as shown in FIG. 17, a user can check the content-using apparatus on which the user can utilize content data with same function and its installation location, and the user can choose the content-using apparatus on which the user can keep utilizing the content data easily.

It should be noted that when information shown in FIG. 17 is displayed on the content-using apparatus, the CPU 10 that operates in conjunction with a program adapted to display the information and the LCD 60 cooperate and function as an apparatus search results display unit.

As described above, on content-using apparatuses in the content using system of this embodiment, information that indicates how a content is used in accordance with a user's operation is generated and stored. Also, the apparatus managing server 1 stores apparatus information that indicates functions on a plurality of content-using apparatus. In keeping using content on another content-using apparatus, the apparatus managing server 1 searches through apparatus information based on information regarding how the content has been used and extracts a content-using apparatus on which a user can keep utilizing the same content under the same conditions as the original apparatus. With these configurations and processes, choosing information processing apparatus can be simple in trying to keep utilizing content in one format on another information processing apparatus.

It should be noted, in the embodiment described above, one "operation" is associated with a plurality of "available functions" in the function association information as described with FIG. 5, and the used function identification unit 106 identifies the used function based on operation information and content of content data as an example. Alternatively, the used function can be determined by referring to a module that operated in processing the content.

For example, in the process shown in FIG. 10, the operation front-end unit 102 stores module information that run in response to user's operation as operation information in addition to the information shown in FIG. 12. That module information is stored as information to identify a configuration that worked in the processing of content data, such as "application A" and "circuit A". And as shown in FIG. 18, the function association information storing unit 104 stores function associating information that associates a combination of "operation" and "running module" with a single function. By using this information, the used function identification unit 106 can identify a single function based on the operation information generated by the operation front-end unit 102 and the function association information shown in FIG. 18.

Also, in the example shown in FIG. 5, a single "operation" such as "displaying ppt" and "displaying pdf" is associated with a plurality of "available functions", and the used function identification unit 106 determines which function was used by referring to information such as processed content data and running module. Alternatively, abstract functions such as "displaying" and "editing" may be associated with each "operation", and the used function identification unit 106 can determine detailed function such as "displaying ppt" and "displaying pdf" in a latter process. In this way, the used function identification unit 106 can also determine which function was used by referring to information such as processed content data and running module.

In the embodiment described above, the operation front-end unit 102 once generates operation information, and the used function identification unit 106 determines used function based on the generated operation information. Alternatively, the used function identification unit 106 determines used function directly referring to user's operation, format of content data and running module described above without generating operation information.

It should be noted that in the case of identifying the used function directly referring to user's operation, format of content data and running module described above, the customized used function identification unit 106 needs to be implemented for each content-using apparatus since possible user's operation is different on each content-using apparatus. By contrast, in the case of generating operation information and then determining used function referring to the operation information as in the embodiment described above, the same used function identification unit 106 can be implemented on each content-using apparatus, and that can improve design efficiency.

Also, in the embodiment described above, association result that includes "content name" and "used function" is generated as shown in FIG. 16. However, as described above, the system can search for other content-using apparatuses by using "used function" information only. Therefore, the object of this embodiment can be achieved by generating not association result information as shown in FIG. 16 but "used function" information at least.

Alternatively, in changing content-using apparatus and keeping using the same content data on another content-using apparatus, content data needs to be transferred to the content-using apparatus. In that case, the function managing server 1 can send association information that includes "content name" as shown in FIG. 16 to the content-using apparatus. By doing that, the content-using apparatus can know which content data should be used, and that can improve user-friendliness.

Furthermore, when a content-using apparatus requests the function managing server 1 to search with sending association information, the content-using apparatus can send content data that will be used on another content-using apparatus. In this case, after searching and extracting an appropriate content-using apparatus, the function managing server 1 can send content data to the appropriate content-using apparatus, and a user can continue using the content data on the content-using apparatus smoothly, and that can improve user-friendliness too.

Also, in the embodiment described above, the function managing server that includes the corresponding apparatus searching unit 109 and the apparatus information storing unit 110 searches for corresponding apparatus based on information received from content-using apparatus as described in FIG. 1 and FIG. 6. Alternatively, each content-using apparatus can include the corresponding apparatus searching unit 109 and the apparatus information storing unit 110 and execute searching. In this case, a content-using apparatus on which a user utilized content data can distribute the content data to another content-using apparatus on which the user will continue utilizing the content data, and that can improve user-friendliness too.

Also, in the embodiment described above, content-using apparatuses are communicably connected with each other via network. Therefore, a content-using apparatus on which a user will continue utilizing content data can receive the content data as described above and that can improve user-friendliness. However, the key point of this embodiment is to show information shown in FIG. 17 to a user and make it easy for the user to determine on which content-using apparatus the user will continue utilizing content data. So, content-using apparatuses are not always have to be connected with each other via network. Also, in case each content-using apparatus includes the corresponding apparatus searching unit 109 and the apparatus information storing unit 110, communicating with the function managing server 1 is not necessary, so each content-using apparatus can be operative in standalone manner. In this case, transferring content data between content-using apparatuses can be implemented by carrying the content data with storing in a removable storage medium.

Also, in the embodiment described above, one content data is used on a content-using apparatus and operation information shown in FIG. 12 and association result information shown in FIG. 16 are generated. However, in using a plurality of content data on a content-using apparatus and continuing using those content data on another content-using apparatus, same efficacy can be achieved by generating operation information shown in FIG. 12 for each content data as shown in FIG. 19 and generating association result information for each content data as shown in FIG. 20 finally.

Also, in the embodiment described above, in determining used function (function required to process content data in response to user's operation), user's operation is referred to determine used function primary and format of content data to be processed and running module are referred as well. In other ways, variety of information can be used to determine used function as described below.

While used function is determined by "operation" with "operated" status only as shown in FIG. 12 in the embodiment described above, it is possible to omit generating operation information and determine used function for all "operation" registered in operation list in FIG. 4 alternatively. In this case, situation like utilizing function unused before changing content-using apparatus on another content-using apparatus can be handled.

In another case, some content-using apparatus can enable/disable each function. In this case, used function can be determined by referring to on/off status of each function on a content-using apparatus without referring to operation information shown in FIG. 12. FIG. 21 illustrates information on on/off status of each "available function". As shown in FIG. 21, the operation front-end unit 102 generates information that indicates "on/off" status of each "available function" corresponding to each content data instead of generating operation information in FIG. 12 when "on/off" status of each function is set in response to user's operation.

And, if the function association information storing unit 104 stores information associating "available function" with "used function" in FIG. 21 like used function associating information described in FIG. 5 and FIG. 18, the used function identification unit 106 can determine used function with reference to function associating information regarding "available function" whose "on/off" status turns to "on". In this case, the used function identification unit 106 can refer to information such as format of content data to be processed and running module in addition to information on "on/off" status of function, and that leads to similar result as described above.

Also, some content-using apparatus needs to install additional device to use its function. For example, an electronic whiteboard needs to install an electronic stylus to utilize writing function with electronic stylus. Therefore, it is possible to determine used function by referring to which additional device is installed on the content-using apparatus. FIG. 22 illustrates information on "connected device" indicating which device was connected when content data was used. In this case, as shown in FIG. 22, the operation front-end unit 102 generates information on "connected device" that indicates which device was connected when the content data was used instead of operation information in FIG. 12 after starting processing content data in response to user's operation.

And, if the function association information storing unit 104 stores information associating "connected device" with "used function" in FIG. 22 like used function associating information described in FIG. 5 and FIG. 18, the used function identification unit 106 can determine used function with reference to function associating information e.g., if "electronic stylus" is included in "connected device", it determines "editing" function could be used. In this case, the used function identification unit 106 can refer to information such as format of content data to be processed and running module in addition to information on connected device, and that leads to similar result as described above.

It is possible to determine whether or not a content data has been edited by comparing its status at starting using the content data with its status at finishing using the content data, in other words its status at searching for other content-using apparatuses. In using a content data on a content-using apparatus, if content data is edited, content itself of content data has been changed by necessity, and information on last modified date/time and data size included in metadata of the content data has also been changed.

Therefore, the used function identification unit 106 can determine whether or not the content data has been edited with reference to the content of the content data or its metadata and determine whether or not "editing" is included in its used function. In this case, in using a content data, the operation front-end unit 102 stores content of the content data and its metadata at start point of its usage in a storage apparatus such as the HDD 40. Then, in starting searching for other content-using apparatus, the used function identification unit 106 compares the stored content of the content data and its stored metadata with the current content of the content data and its current metadata, and the used function identification unit 106 determines used function only includes "displaying" if they are the same. By contrast, the used function identification unit 106 determines used function includes "displaying" and "editing" if they are not the same.

It should be noted that information such as hash value of content data can be used as content of the content data other than using the content data itself, thereby reducing necessary storage area and processing load. Also, more detailed displaying/editing functions can be determined by referring to information such as the format of targeted content data and running module.

Also, in the embodiment described above, while details of used functions such as "displaying" and "editing" are determined with reference to the content data extension, "editing" is not always the rule in some data formats. For example, while text data is a data format that is relatively easy to edit and is often used with editing at meetings, etc., data formats such as images like jpg and documents like pdf are generally used as is in presentations and are not generally edited on site. Therefore, the used function identification unit 106 can determine whether the used function is either "displaying" only or "displaying"/"editing" with reference to content data extension.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application specific integrated circuits or by interconnecting an appropriate network of conventional component circuits, as will be readily apparent to those skilled in the relevant art.

What is claimed is:

1. A content processing apparatus, comprising:
    a content processing unit configured to process content data in response to a user's operation so that the user can utilize the content data;
    an operation information generating unit configured to generate operation information that indicates an operation executed by a user with reference to operation list information which indicates operations that can be executed by the user;
    a used function identification unit configured to,
        identify a used function used to process the content data that the user utilized based at least on an additional device that is connected to a previously used content-using apparatus when the content data was used, and in the identifying, the used function identification unit is configured to identify the function used to process the content data with reference to available function associating information that associates a possible operation on the content processing apparatus with a required function to process the content data in accordance with the operation,
        determine whether the content data can be used in a same way on a different content-using apparatus based on the identified used function, and
        generate used function information indicating the identified function;
    a used function associating unit configured to generate information associating the function identified by the used function identification unit with the content data; and
    an apparatus search result display unit configured to display information of a content-using apparatus to a user, the information of the content-using apparatus extracted by searching through apparatus information based on the used function information, the information of the content-using apparatus including an apparatus name and an installation location, the installation location indicating a physical location of the content-using apparatus.

2. The content processing apparatus according to claim 1, wherein the used function identification unit is configured to identify a function used to process the content data based on a function installed in the content processing apparatus.

3. The content processing apparatus according to claim 1, further comprising:
    a switching unit configured to switch between enable and disable for each function installed in the content processing apparatus, and
    the used function identification unit is configured to identify a function used to process the content data with reference to a function enabled at the time the content data was processed.

4. The content processing apparatus according to claim 1, wherein the used function identification unit is configured to identify a function used to process the content data with reference to a device connected to the content processing apparatus at the time the content data was processed.

5. The content processing apparatus according to claim 1, wherein the used function identification unit is configured to identify a function used to process the content data based on a difference in content data between when usage of the content data was started and when the used function identification unit identifies the function used to process the content data.

6. The content processing apparatus according to claim 1, wherein the used function identification unit is configured to identify a function used to process the content data with reference to the format of the content data.

7. A method of processing content data on a plurality of different content-using apparatuses, comprising:

processing content data to allow a user to use the content data in accordance with the user's operation;

generating operation information that indicates an operation executed by a user with reference to operation list information which indicates operations that can be executed by the user;

identifying a function used to process the content data based at least on an additional device that is connected to a previously used content-using apparatus when the content data was used, identifying including identifying the function used to process the content data with reference to available function associating information that associates a possible operation on the content processing apparatus with a required function to process the content data in accordance with the operation;

determining whether the content data can be used in a same way on a different content-using apparatus based on the identified used function;

generating function information that includes information on the identified function used to process the content data;

generating information associating the identified function with the content data; and searching through apparatus information associating a content-using apparatus capable of utilizing the content data with a function available to use the content data based on the generated function information generated in the generating step; and displaying information of an extracted content-using apparatus to a user, the information of the content-using apparatus including an apparatus name and an installation location, the installation location indicating a physical location of the content-using apparatus.

8. A content processing system comprising the content processing apparatus according to claim 1.

9. The content processing apparatus according to claim 1, wherein the information generated by the used function associating unit describes how content data was used on a particular content-using apparatus.

10. The method of processing content data according to claim 7, wherein generating information associating the identified function with the content data describes how content data was used on a particular content-using apparatus.

* * * * *